(12) United States Patent
Wakabayashi (10) Patent No.: US 10,965,528 B2
(45) Date of Patent: Mar. 30, 2021

(54) INFORMATION PROCESSING APPARATUS FOR OUTPUTTING DATA ACQUIRED FROM SERVER, INFORMATION PROCESSING METHOD, AND STORAGE MEDIUM

(71) Applicant: CANON KABUSHIKI KAISHA, Tokyo (JP)

(72) Inventor: Yuuki Wakabayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/439,173

(22) Filed: Jun. 12, 2019

(65) Prior Publication Data

US 2019/0386873 A1 Dec. 19, 2019

(30) Foreign Application Priority Data

Jun. 18, 2018 (JP) .............................. JP2018-115546

(51) Int. Cl.
*G06F 15/177* (2006.01)
*H04L 12/24* (2006.01)
*G06Q 10/10* (2012.01)

(52) U.S. Cl.
CPC ......... *H04L 41/0813* (2013.01); *G06Q 10/10* (2013.01); *H04L 41/5003* (2013.01)

(58) Field of Classification Search
CPC .. H04L 41/0813; H04L 41/5003; G06Q 10/10
See application file for complete search history.

(56) References Cited

U.S. PATENT DOCUMENTS

| | | | |
|---|---|---|---|
| 2012/0200390 A1* | 8/2012 | Saravanan | G07C 9/28 340/5.61 |
| 2013/0030826 A1* | 1/2013 | Blom | G06Q 50/22 705/2 |
| 2013/0263227 A1* | 10/2013 | Gongaware | H04L 63/08 726/4 |
| 2014/0180826 A1* | 6/2014 | Boal | G06Q 30/0245 705/14.66 |
| 2014/0267547 A1* | 9/2014 | Torgersrud | H04W 12/0605 348/14.02 |
| 2014/0282896 A1* | 9/2014 | Torgersrud | H04W 4/12 726/4 |
| 2015/0350463 A1* | 12/2015 | Moore | G06F 3/04845 715/743 |
| 2016/0103690 A1* | 4/2016 | Kim | G06K 7/1447 704/8 |
| 2016/0232769 A1* | 8/2016 | Jarvi | G01V 5/0025 |
| 2016/0247341 A1* | 8/2016 | Talwerdi | G07C 9/257 |
| 2018/0218733 A1* | 8/2018 | Raanani | G06N 20/00 |

FOREIGN PATENT DOCUMENTS

JP 2015-35170 A 2/2015

* cited by examiner

*Primary Examiner* — Richard G Keehn
(74) *Attorney, Agent, or Firm* — Canon U.S.A., Inc. IP Division (57) ABSTRACT

In an information processing apparatus, in response to a first instruction provided by a user, data previously saved is output, while designation of language setting and acquisition of data are not executed. Further, in response to a second instruction that is different from the first instruction and provided by the user, language setting is designated for the server, data corresponding to the language setting is acquired, and the acquired data is saved as a new output target.

19 Claims, 7 Drawing Sheets

INFORMATION PROCESSING APPARATUS FOR OUTPUTTING DATA ACQUIRED FROM SERVER, INFORMATION PROCESSING METHOD, AND STORAGE MEDIUM

BACKGROUND

Field of the Disclosure

The present disclosure generally relates to an information processing apparatus for outputting data acquired from a server, an information processing method, and a storage medium.

Description of the Related Art

In these days, there is known a form in which an application program runs on an information terminal operated by a user, and the application program accesses a web server to utilize a program executed by the web server (hereinafter referred to as a "web program"). For use of the application program, a user who intends to use the application program is presented with agreement items created by a provider of the application program (hereinafter referred to as an "application provider"). The agreement items include notes about handling of user information by a web program provider when the user uses the web program. The agreement items further include codes of use for the user using the web program. Upon reading and agreeing to the agreement items, the user is permitted to use the web program.

Japanese Patent Application Laid-Open No. 2015-35170 discusses presentation of agreement items to an information terminal by a web server.

It is conceivable that a user may check again the agreement items, to which the user has previously agreed, at the timing unrelated to access to the web server. Even in this case, the agreement items cannot be displayed unless the information terminal acquires the agreement items from the web server, according to the technique discussed in Japanese Patent Application Laid-Open No. 2015-35170.

One conceivable way of addressing this situation is to save the agreement items into the information terminal beforehand, so that access to the web server is made unnecessary. However, for example, there is a case where a plurality of sets of agreement items is prepared in a plurality of languages, and the agreement items described in a specific language corresponding to a language setting among the plurality of languages is displayed. In this case, it is necessary to save all the sets of agreement items into the information terminal so that any language can be supported depending on the language setting. Therefore, unnecessary agreement items are also saved in the information terminal.

SUMMARY

The present disclosure is directed to an information processing apparatus capable of outputting appropriate data corresponding to a language setting, in response to a predetermined instruction provided by a user, without acquiring predetermined data from a server in response to the predetermined instruction, and without saving data corresponding to multiple languages.

According to an aspect of the present disclosure, an information processing apparatus includes a designation unit configured to designate a language setting for a server, an acquisition unit configured to acquire data corresponding to the language setting designated by the designation unit from the server, a saving unit configured to save the data acquired by the acquisition unit into a storage unit, and an output unit configured to output the data, wherein in response to a first instruction provided by a user, data saved by the saving unit is output by the output unit, while designation of the language setting by the designation unit and acquisition of data by the acquisition unit are not executed, and wherein in response to a second instruction that is provided by the user and different from the first instruction, the language setting that is made when the second instruction is provided is designated for the server by the designation unit, data corresponding to the language setting is acquired by the acquisition unit, and the acquired data is saved into the storage unit by the saving unit as a new output target to be output by the output unit.

Further features of the present disclosure will become apparent from the following description of exemplary embodiments with reference to the attached drawings.

DESCRIPTION OF THE EMBODIMENTS

Various exemplary embodiments, features, and aspects of the present disclosure will be described in detail below with reference to the attached drawings. The exemplary embodiments to be described below are not intended to provide a narrow interpretation of contents described in the scope of claims. In addition, not all combinations of features to be described below are necessary for the present disclosure.

Figure 1:
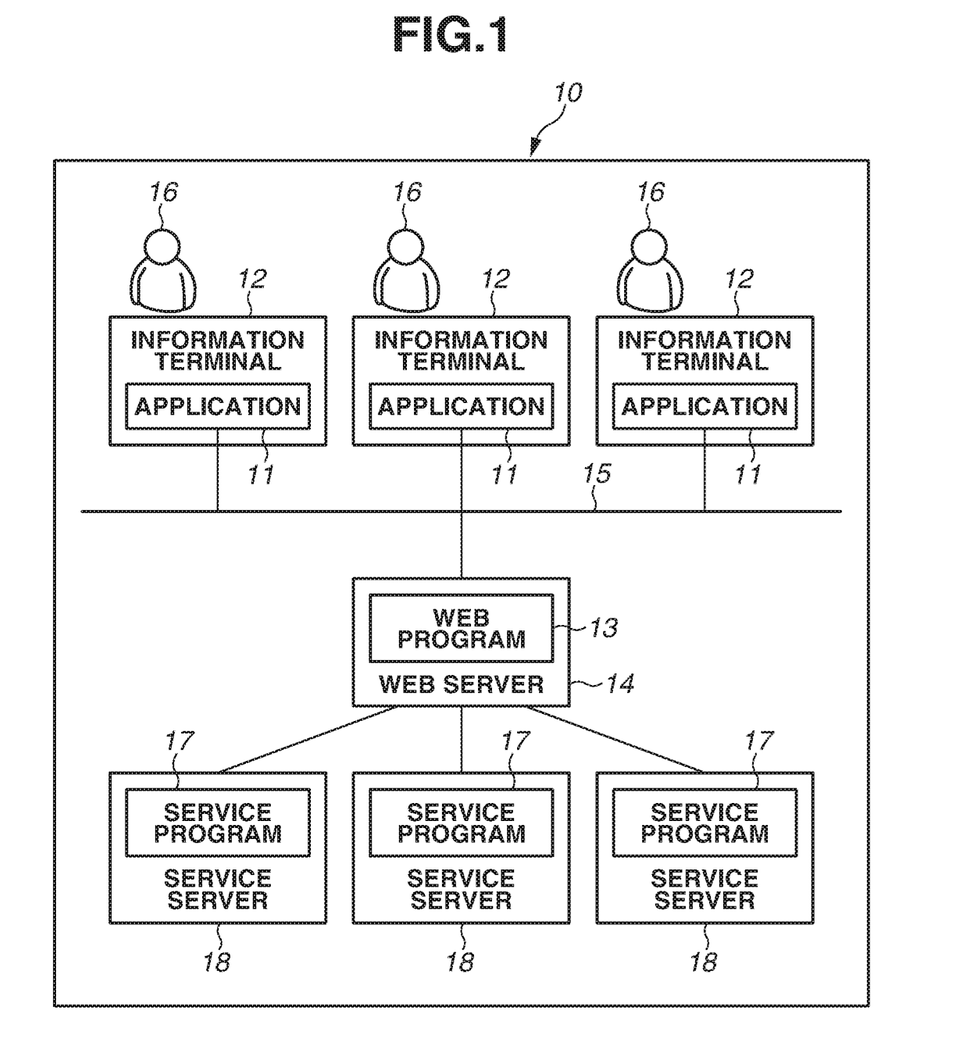
FIG. 1 is a block diagram illustrating a schematic configuration of a system according to an exemplary embodiment.

FIG. 1 is a block diagram illustrating a schematic configuration of a system 10 according to an exemplary embodiment. As illustrated in FIG. 1, an information terminal 12 and a web server 14 are connected via a network 15 such as the Internet or an intranet. An application 11 is installed in the information terminal 12, and a web program 13 runs in the web server 14.

The information terminal 12 is an information processing apparatus such as a personal computer, a smartphone, or a tablet. In the present exemplary embodiment, the smartphone will be described as an example.

The web server 14 manages the web program 13 in a storage unit. When the web server 14 receives a request for use of the web program 13 from the information terminal 12, the web server 14 executes the web program 13 on the web server 14. The web server 14 then provides the result of the program execution to the application 11 installed in the information terminal 12. The information terminal 12 is a terminal for using the web program 13 by communicating with the web server 14. A user 16 uses the web program 13 via the application 11 installed in the information terminal 12.

A service server 18 provides various services that are used by the information terminal 12 via the web server 14. A service program 17 is a program for providing the service. As illustrated in FIG. 1, the web server 14 may be connectable to a plurality of service servers 18. In this case, the plurality of service servers 18 provides respective different services. When a service is selected in the information terminal 12, the service server 18 corresponding to the selected service provides the service via the web server 14.

In the present exemplary embodiment, an application program that can execute printing on a printer or execute scanning an original-document on a scanner (not illustrated) will be described as an example of the application 11. A photo storage service and a social network service are included in the services provided by the service server 18. The application 11 performs processing for execution of cloud printing for printing an image stored in the service server 18, using a printer (not illustrated), via the network 15. Alternatively, the application 11 performs processing for execution of cloud scanning for reading an original document, using the scanner (not illustrated), via the network 15.

Next, a configuration of each of the web server 14 and the information terminal 12 will be described with reference to FIGS. 2 to 4.

Figure 2:
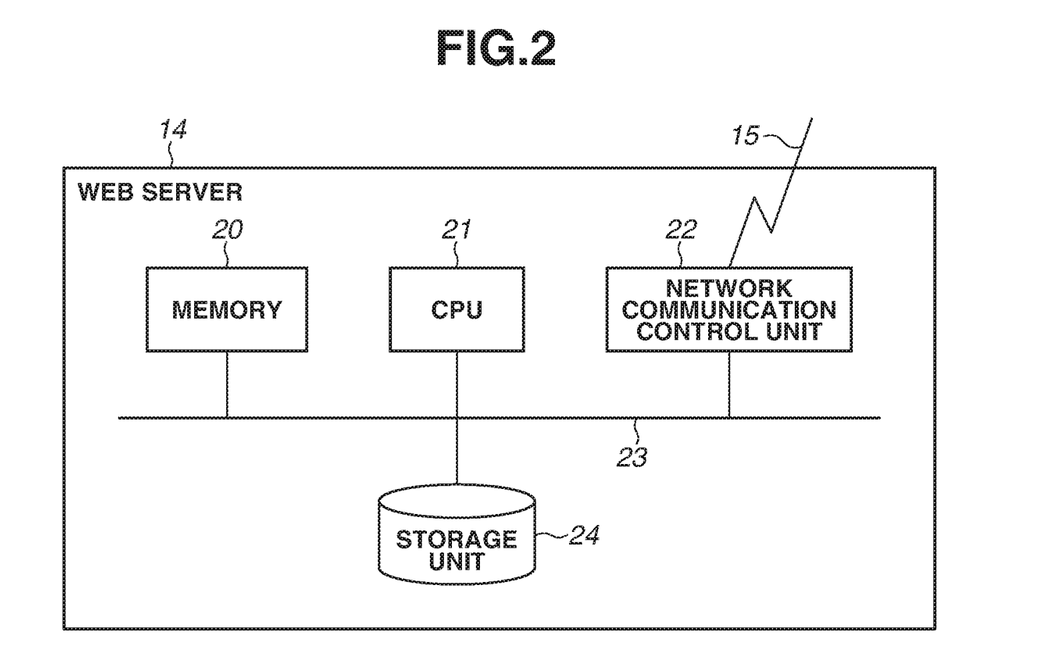
FIG. 2 is a block diagram illustrating a configuration of a web server.

FIG. 2 is a block diagram illustrating a configuration of the web server 14. As illustrated in FIG. 2, the web server 14 includes a memory 20, a central processing unit (CPU) 21, a network communication control unit 22, and a storage unit 24 that are interconnected via a bus 23.

The CPU 21, which may include one or more processors, one or more memories, circuitry, or a combination thereof, may read and execute various programs and data stored in the storage unit 24. The memory 20 is used, for example, as a work memory when the CPU 21 executes a program. The network communication control unit 22 is a control unit for transmitting and receiving information via the network 15.

The web server 14 may be configured of one server apparatus, or may be configured of a plurality of server apparatuses as a server system. In a case where the web server 14 is configured of the plurality of server apparatuses, for example, a server apparatus includes the CPU 21 and the memory 20 and another server apparatus includes the storage unit 24. In this case, the separate server apparatuses may serve as the web server 14 by communicating with each other via a network to cooperate with each other.

Figure 3:
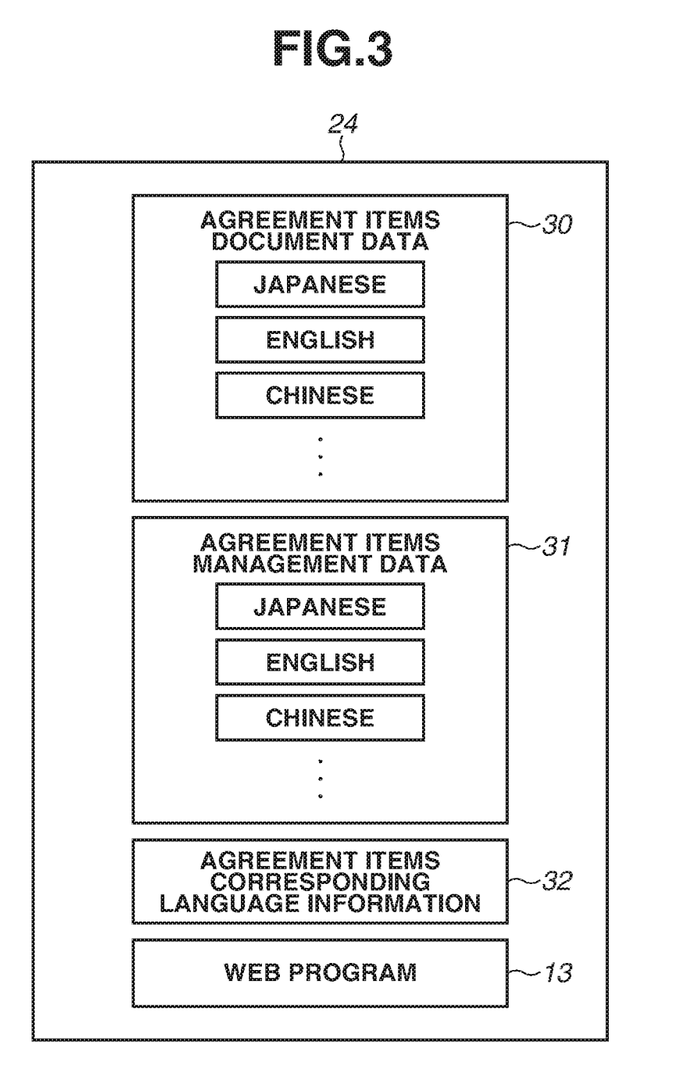
FIG. 3 is a block diagram illustrating data, information, and a program stored in the web server.

FIG. 3 is a block diagram illustrating data, information, and a program stored in the storage unit 24 of the web server 14. The storage unit 24 is a nonvolatile rewritable storage unit including a hard disk drive (HDD) and/or a flash memory. The storage unit 24 stores the web program 13 that is the main body of a program to be executed by the web server 14 to transmit a web program to the information terminal 12. The storage unit 24 also stores data and information such as agreement items document data 30, agreement items management data 31, and agreement items corresponding language information 32.

The agreement items document data 30 stored in the storage unit 24 is data that represents some or all of agreement items and includes document data for each of corresponding languages to be used when the web program 13 is provided. Thus, the web server 14 can provide only specific document data related to the agreement items corresponding to a specific language, among the document data stored in the storage unit 24. The agreement items management data 31 may include information indicating the update date/time of the agreement items, and includes management data prepared for each of the corresponding languages.

When the agreement items are changed, the document data in the agreement items document data 30 is overwritten. For example, in a case where only the agreement items corresponding to a specific language are updated, only the document data for the specific language is overwritten, and the document data for other languages is not overwritten. When the document data in the agreement items document data 30 is overwritten, usually, the management data in the agreement items management data 31 including the information indicating the update date/time of the agreement items is also overwritten, based on an update date/time. Further, in a case where only the agreement items corresponding to a specific language are updated, only the management data for the specific language in the agreement items management data 31 is overwritten. However, even if the document data in the agreement items document data 30 is overwritten, the management data in the agreement items management data 31 is not necessarily overwritten, depending on the content of a change in the agreement items.

The agreement items corresponding language information 32 is information indicating to which language the document data corresponds (e.g., in which language the document data is described). The document data is included in the agreement items document data 30 and corresponds to each of the languages. The format of the agreement items corresponding language information 32 may be any of various types of format. The format may be, for example, a table that indicates correspondence between the file name of the document data corresponding to each of the languages, and language information indicating the language corresponding to the document data. For example, in a case where a corresponding language is added in the web program 13, the agreement items corresponding language information 32 is updated, and the agreement items document data 30 is changed to include new document data representing the agreement items described in the added corresponding language. On the contrary, in a case where a corresponding language is deleted in the web program 13, the agreement items corresponding language information 32 is updated, and the document data representing the agreement items described in the deleted corresponding language is deleted from the agreement items document data 30.

Figure 4:
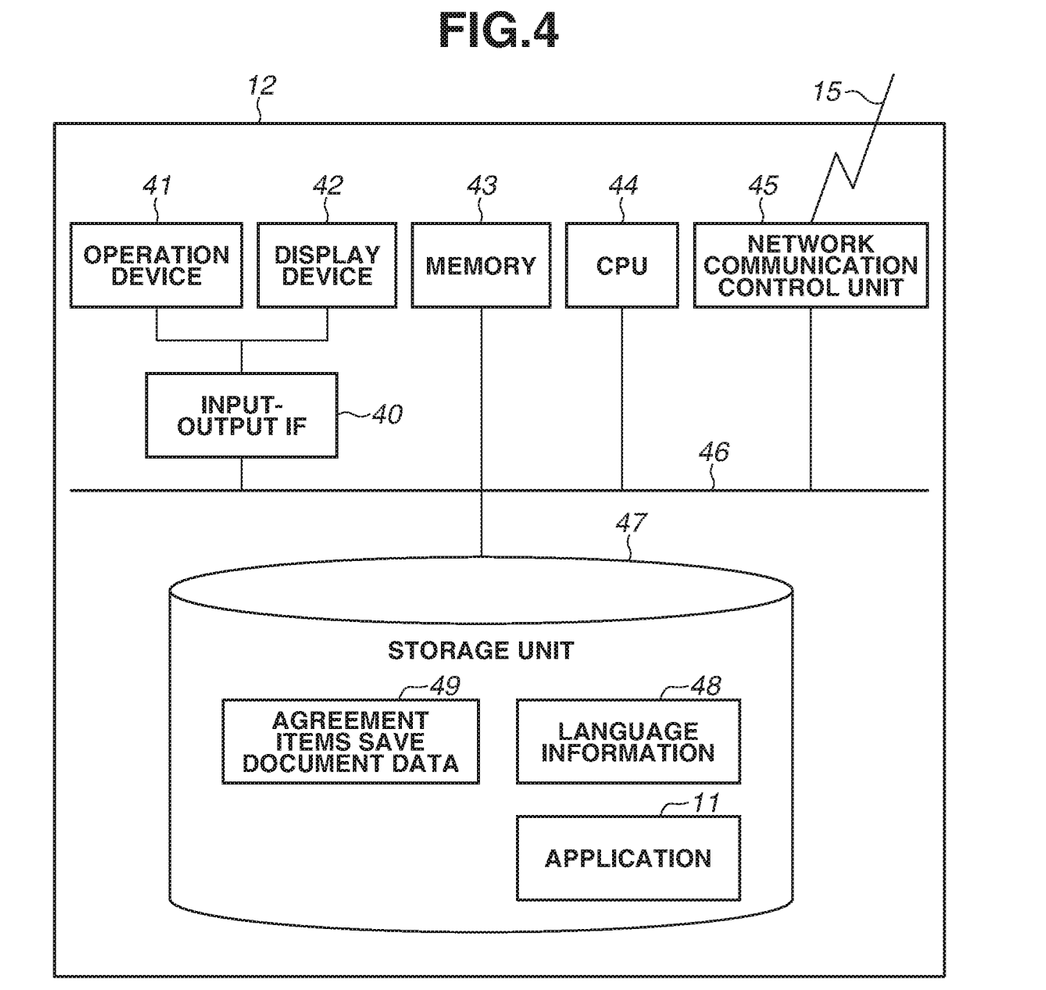
FIG. 4 is a block diagram illustrating a configuration of an information terminal.

FIG. 4 is a block diagram illustrating a configuration of the information terminal 12. As illustrated in FIG. 4, the information terminal 12 includes a memory 43, a CPU 44, an input-output interface (IF) 40, an operation device 41, a display device 42, a network communication control unit 45, and a storage unit 47 that are interconnected via a bus 46.

The CPU 44, which may include one or more processors, one or more memories, circuitry, or a combination thereof, may execute various programs including the application 11 to be described below that are stored in the storage unit 47. The memory 43 is used, for example, as a work memory when the CPU 44 executes the program. The operation device 41 and the display device 42 are connected to the input-output IF 40. The operation device 41 includes a keyboard, a mouse, buttons, and a touch panel that are operated by the user 16. The display device 42 is controlled by the CPU 44 to display characters and images, and includes a monitor. The network communication control unit 45 is a control unit for transmitting and receiving information via the network 15. The storage unit 47 stores the application 11.

The storage unit 47 also stores various data, such as language information 48 about a user who operates the information terminal 12, and agreement items saved document data 49. As will be described below, when the user agrees to the agreement items indicated by the agreement items document data 30 saved in the web server 14, the agreement items document data 30 is downloaded to the information terminal 12, and then saved as the agreement items saved document data 49.

Figure 7A:
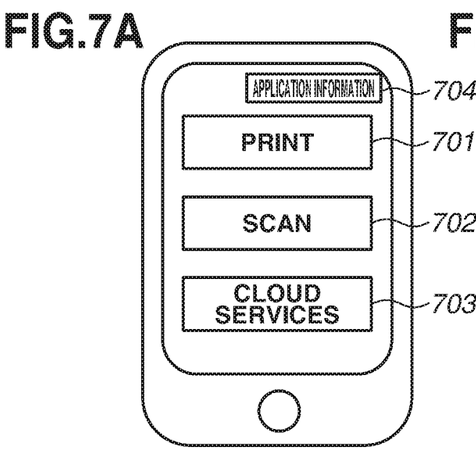
FIGS. 7A to 7F are diagrams each illustrating an example of a screen displayed by an application program.

FIGS. 7A to 7F are diagrams each illustrating an example of a screen displayed by the application 11. FIG. 7A is a screen for a user to select a function provided by the application 11.

A print button 701 is a button for selecting a print function. When the user touches the print button 701, selects an image, and provides a print instruction, the information terminal 12 is controlled by the network communication control unit 45 to transmit the image stored in the information terminal 12 to a printer via communication such as wireless local area network (LAN). Then, the printer prints the image. A scan button 702 is a button for selecting a scan function. When the user touches the scan button 702 and provides a scan instruction, the information terminal 12 is controlled by the network communication control unit 45 to issue a reading instruction to a scanner, via communication such as wireless LAN. In response to the reading instruction, the scanner reads an original document, and the information terminal 12 receives data obtained by the reading, via the communication such as wireless LAN.

Figure 7B:
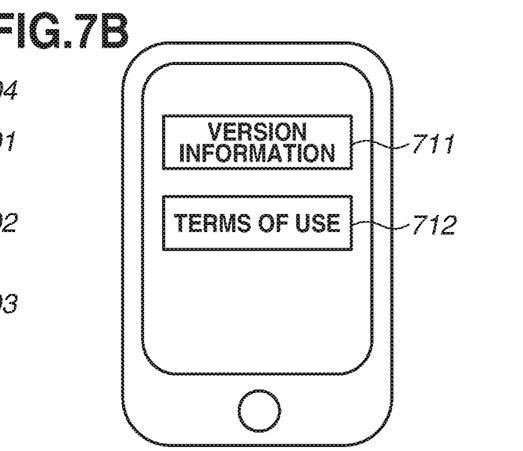

When an application information button 704 is touched, the screen displayed by the application 11 transitions to the screen illustrated in FIG. 7B. When a version information button 711 illustrated in FIG. 7B is touched, the version information of the application 11 is displayed. When a terms-of-use button 712 is touched, the screen displayed by the application 11 transitions to the screen illustrated in FIG. 7C.

Figure 7C:
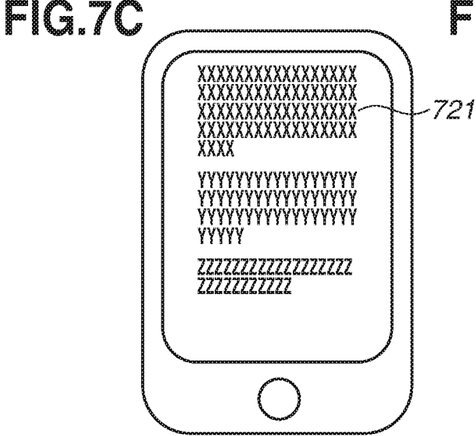

Agreement items 721 illustrated in FIG. 7C represent the agreement items previously agreed to and displayed based on the agreement items saved document data 49. When the screen illustrated in FIG. 7C is displayed, the information terminal 12 refers to the agreement items saved document data 49, without accessing the web server 14. In other words, the program corresponding to the application 11 is not created to cause the information terminal 12 to access the web server 14 when the CPU 44 detects the touch of the terms-of-use button 712. The program is created to cause the CPU 44 to refer to the agreement items saved document data 49. Accordingly, when the terms-of-use button 712 is touched, the agreement items 721 can be displayed, even if the information terminal 12 is not connected to the network. Alternatively, while the screen illustrated in FIG. 7C is displayed, the information terminal 12 may access the web server 14 for a purpose different from that of the agreement items document data 30. In this case as well, the agreement items 721 can be displayed, even if the information terminal 12 does not acquire the agreement items document data 30 from the web server 14.

Figure 7D:
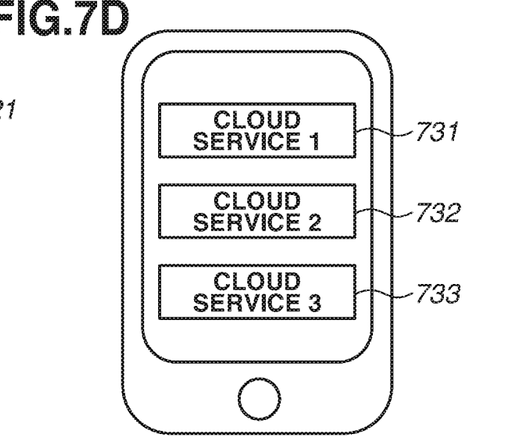

When a cloud service button 703 illustrated in FIG. 7A is touched, the screen displayed by the application 11 transitions to the screen illustrated in FIG. 7D. Buttons 731, 732, and 733 (indicating cloud services 1, 2, and 3, respectively) illustrated in FIG. 7D are each provided to receive an instruction for selecting a desired cloud service. Each of the cloud services 1 to 3 illustrated in FIG. 7D is provided by any one of the service servers 18 illustrated in FIG. 1. For example, the button 731 indicates a predetermined social network service, the button 732 indicates a predetermined photo storage service, and the button 733 indicates a photo storage service different from the photo storage service indicated by the button 732.

Figure 5:
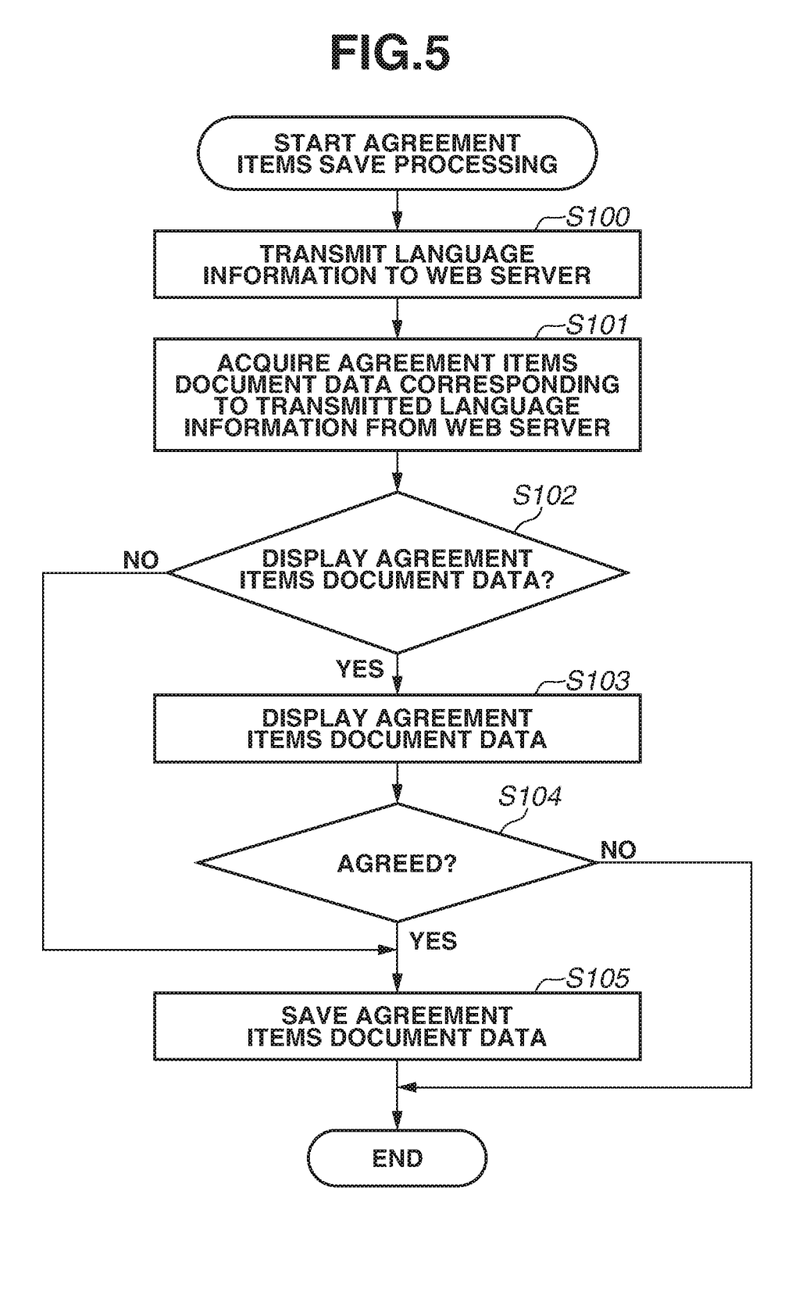
FIG. 5 is a flowchart illustrating processing for saving agreement items.

Next, a determination processing flow for saving the agreement items will be described with reference to FIG. 5. FIG. 5 is a flowchart illustrating processing for saving the agreement items. The processing illustrated in FIG. 5 starts when a cloud service is selected by the touch of any of the buttons 731 to 733 in the screen illustrated in FIG. 7D. Processing in each step illustrated in FIG. 5 is performed when the CPU 44 executes the application 11, which is stored in the storage unit 47, using the memory 43 as the work memory.

In step S100, the CPU 44 transmits the language information 48 to the web server 14. The language information 48 may be based on, for example, language setting in the information terminal 12. Alternatively, the language information 48 may be based on local setting in the information terminal 12, or on language setting in the application 11.

When the web server 14 receives the language information 48 in step S100, the web server 14 transmits the agreement items document data 30 corresponding to the language information 48 to the information terminal 12. In step S101, the CPU 44 acquires the agreement items document data 30 that corresponds to the language information 48 that has been transmitted from the web server 14. For example, if "Japanese" is transmitted as the language information 48 in step S100, the agreement items document data 30 described in Japanese is acquired in step S101. If "English" is transmitted as the language information 48, the agreement items document data 30 described in English is acquired in step S101.

When the agreement items document data 30 in the language corresponding to the language information 48 transmitted in step S100 is not present in the web server 14, the information terminal 12 acquires the agreement items document data 30 that corresponds to a reference language and is present in the web server 14. The web server 14 transmits the agreement items document data 30 in the reference language that has been previously determined by the web server 14. Alternatively, the reference language may be determined in the application 11 beforehand. In this case, the information terminal 12 may acquire the agreement items document data 30 corresponding to the reference language, by requesting the web server 14 to provide the agreement items document data 30 corresponding to the reference language. For example, assume that the reference language is English. In this case, the information terminal 12 acquires the agreement items document data 30 in English that is the reference language, when, for example, "French" is transmitted as the language information 48 in a case where the agreement items document data 30 in French is not present in the web server 14. The reference language is not limited to English and may be any language, if the language is present in the web server 14 as a language describing the agreement items document data 30.

In step S102, the CPU 44 determines whether to display the agreement items document data 30 acquired in step S101. For example, in a case where the user has previously agreed to the agreement items, and the content of the agreement items document data previously agreed to and the content of the agreement items document data 30 acquired from the web server 14 are the same, the CPU 44 determines not to display the agreement items document data 30. A comparison between the contents (text information) of the respective pieces of document data is performed as a method for determining whether the contents are the same. Alternatively, the CPU 44 may determine whether to display the agreement items document data 30, based on information other than the content (text information). For example, the CPU 44 may determine to display the agreement items document data 30 if the timing of creation of the agreement items document data 30 acquired from the web server 14 is later than that of the agreement items document data previously agreed to, whereas the CPU 44 may determine not to display the agreement items document data 30 if the former is not later than the latter. The information for determining which one of the creation dates of the respective sets of agreement items is later may be any kind of information in which one of the creation dates is later can be determined based on this information. Examples of such information include information indicating a content creation date, information indicating the management number of the content, and information indicating the version information of the content.

Figure 7E:
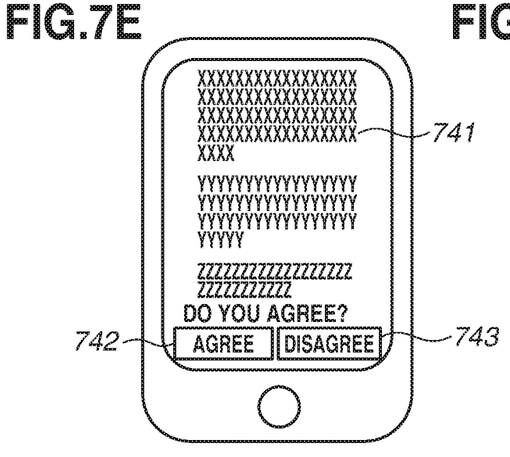

In step S102, if the CPU 44 determines to display the agreement items document data 30 (YES in step S102), the processing proceeds to step S103. In step S103, the CPU 44 displays the agreement items document data 30 acquired in step S101. FIG. 7E illustrates the screen displayed in step S103. FIG. 7E illustrates agreement items 741 described in the language corresponding to the language information 48 transmitted in step S100. FIG. 7E illustrates a button 742 to be used by the user to notify the application 11 that the user agrees to the agreement items 741, and a button 743 to be used by the user to notify the application 11 that the user disagrees with the agreement items 741.

In step S104, the CPU 44 determines whether the user has agreed to the agreement items. Specifically, the CPU 44 performs this determination by determining which one of the buttons 742 and 743 illustrated in FIG. 7E is touched. The method for determining the agreement is not limited to the above-described example. For example, instead of displaying the buttons 742 and 743, the CPU 44 displays a checkbox to be marked for agreeing to the agreement items. The user then touches an "OK" button, in a state where the checkbox is marked or not. In this case, the CPU 44 determines, when the "OK" button is pressed, that the user has agreed to the agreement items if the checkbox is marked, or determines that the user has not agreed to the agreement items if the checkbox is not marked.

If the CPU 44 determines that the user has not agreed to the agreement items in step S104 (NO in step S104), the processing illustrated in FIG. 5 ends. In this case, the screen displayed by the application 11 transitions to the screen illustrated in FIG. 7A or FIG. 7D.

If the CPU 44 determines not to display the agreement items in step S102 (NO in step S102), or if the CPU 44 determines that the user has agreed to the agreement items in step S104 (YES in step S104), the processing proceeds to step S105. In step S105, the CPU 44 saves the agreement items document data 30 acquired in step S101 into the information terminal 12, as the agreement items saved document data 49 of a new display target (i.e., an output target). In step S105, if the agreement items saved document data 49 that has been previously acquired is present, the agreement items saved document data 49 is overwritten with the agreement items document data 30 displayed in step S103.

When the processing illustrated in FIG. 5 ends, the screen displayed by the application 11 transitions to a screen provided by the service program 17 corresponding to the cloud service selected in the screen illustrated in FIG. 7D. The screen provided by the service program 17 may be displayed by a web browser different from the application 11. In this case, the application 11 notifies the web browser of information for accessing the service server 18 corresponding to the service selected in the screen illustrated in FIG. 7D.

According to the processing illustrated in FIG. 5, the agreement items described in the language corresponding to the latest language information are saved into the information terminal 12, when a user instruction for selecting a desired cloud service is received. In particular, even if the CPU 44 determines not to display the agreement items in step S102, the agreement items described in the language corresponding to the latest language information are saved in step S105. Assume that the user has agreed to the agreement items described, for example, in "Japanese" and then changed the language setting to English. Subsequently, when the user provides an instruction for selecting a desired cloud service, the agreement items in English having the same update date/time as that of the agreement items in Japanese are saved as the agreement items saved document data 49 without being displayed. In step S102, even if the language setting of the agreement items previously saved and the language setting of the new agreement items acquired in step S101 are different, step S103 is skipped if the display condition in step S102 is not satisfied. Therefore, the agreement items corresponding to the latest language setting can be saved into the information terminal 12, as appropriate.

Further, when the terms-of-use button 712 in FIG. 7B is touched, the agreement items previously agreed to are displayed based on the agreement items saved document data 49. At this moment, designation of the language setting for the web server 14 and acquisition of the agreement items document data 30 from the web server 14 are not performed.

The above-described processing enables the user to confirm the agreement items previously agreed to, without connecting the information terminal 12 to the Internet, when the user desires to confirm the agreement items later. Meanwhile, even if the language setting in the information terminal 12 is changed to a language different from the language information transmitted in step S100, the flow illustrated in FIG. 5 is executed again when the cloud service is used, so that the language information after the change is transmitted in step S100. Therefore, the agreement items document data in the language after the change is acquired in step S101.

Even if only the language setting in the information terminal 12 is changed, and the agreement items document data previously agreed to are not updated, the agreement items are not displayed in step S102, and instead the agreement items document data 30 acquired in step S105 is saved. After the cloud service is used, the agreement items saved document data 49 is thereby changed to correspond to the language after the change. Therefore, when the user checks the agreement items document data afterward, it is possible to display the agreement items document data in the language most suitable for the language setting in the information terminal 12, without connecting the information terminal 12 to the Internet.

As described above, although the processing illustrated in FIG. 5 starts when the user selects the cloud service in the screen illustrated in FIG. 7D, the processing may start when the cloud service button 703 illustrated in FIG. 7A is touched. However, the processing illustrated in FIG. 5 starts when the user selects the cloud service displays the agreement items to the user, and thus, the user can be aware of a plurality of selectable cloud services.

Figure 7F:
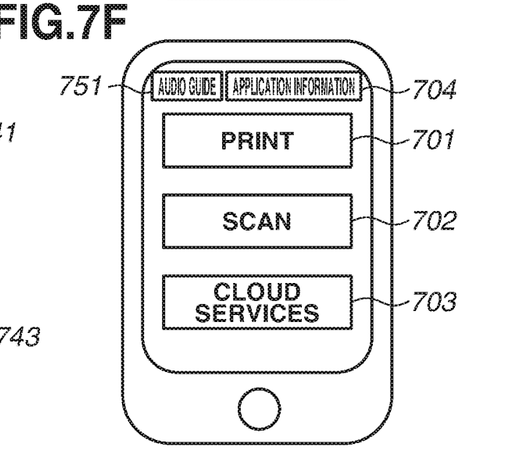

In the above-described exemplary embodiment, the agreement items document data is described as an example of saving target data transmitted from the web server 14 and stored into the information terminal 12. Further, displaying is described as an example of a method for outputting the target data to be saved. Next, a case where the target data to be saved and the output method therefor are audio data and audio output thereof, respectively, will be described. The application 11 in this case may be any of various kinds of application programs. Further, the content of the audio data may be any of various kinds of audio data. For example, the application 11 may be an application program for executing printing with a printer or scanning with a scanner, as with the application program described above. Further, the content of the audio data may be audio guidance for guiding operations for executing printing with the printer or scanning with the scanner. In this case, the application 11 displays a screen illustrated in FIG. 7F. The screen illustrated in FIG. 7F is different from the screen illustrated in FIG. 7A, only in that an audio guide button 751 is included. The audio guidance is output based on the audio data stored in the storage unit 24 of the information terminal 12, when the audio guide button 751 is touched. During the output of the audio guidance, accessing the web server 14 is not performed, and the audio guidance about a displayed screen is output as the audio data. For example, an audio file corresponding to each screen is stored in the storage unit 24, and when the audio guide button 751 displayed in each screen is touched, the audio guidance of the relevant screen is output. For example, in the example illustrated in FIG. 7F, the voice is output to explain a function to be implemented when each of the buttons 701 to 703 is touched.

Figure 6:
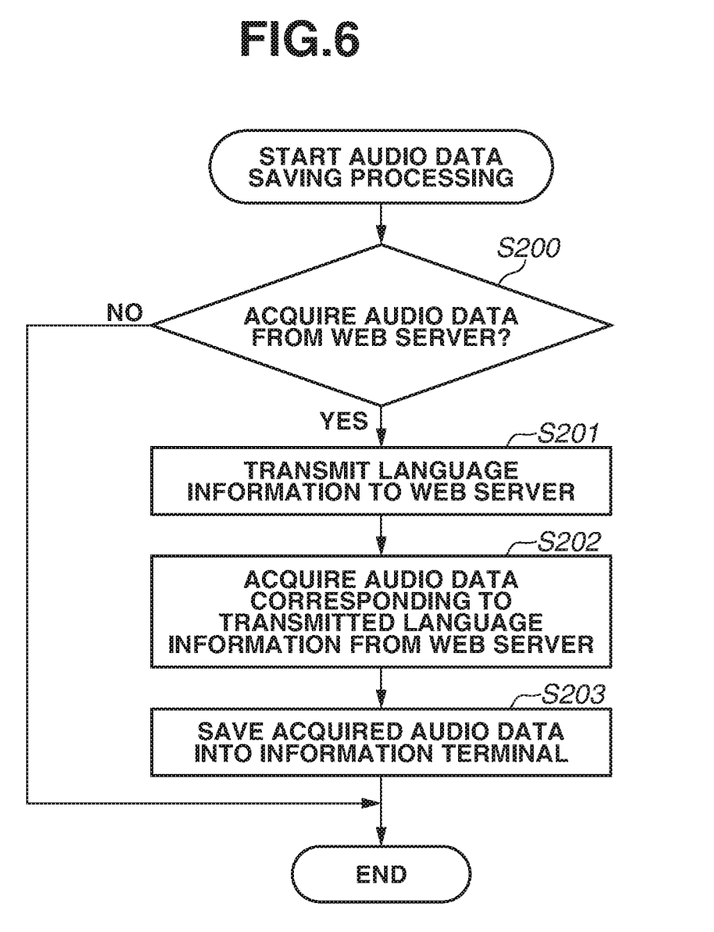
FIG. 6 is a flowchart illustrating processing for saving audio data.

FIG. 6 is a flowchart illustrating processing for saving the audio data. Each processing of steps illustrated in FIG. 6 is performed when the CPU 44 executes the application 11, which is stored in the storage unit 47, using the memory 43 as the work memory. As with FIG. 5, the processing illustrated in FIG. 6 starts when the user selects a desired cloud service in the screen illustrated in FIG. 7D that is provided by the application 11.

In step S200, the CPU 44 determines whether to acquire the audio data from the web server 14. As a method for performing the determination, for example, a comparison between the language setting associated with the audio data stored in the information terminal 12 and the current language setting in the information terminal 12 is employed. If the comparison result is "same", the CPU 44 determines not to acquire the audio data. If the comparison result is "different", the CPU 44 determines to acquire the audio data. If the CPU 44 determines to acquire the audio data (YES in step S200), the processing proceeds to step S201, and the CPU 44 transmits the language information to the web server 14. The web server 14 transmits the audio data corresponding to the language indicated by the received language information (i.e., the audio data spoken in this language) to the information terminal 12. In step S202, the CPU 44 acquires the audio data thus transmitted from the web server 14. In step S203, the CPU 44 saves the audio data, which is acquired from the web server 14 in step S202, into the storage unit 47 of the information terminal 12, and then the processing illustrated in FIG. 6 ends. If the CPU 44 determines not to acquire the audio data (NO in step S200), the processing illustrated in FIG. 6 ends.

According to the processing illustrated in FIG. 6, if the saved audio data is, for example, in Japanese when the application 11 is activated, and the current language setting in the information terminal 12 is English, the CPU 44 determines to acquire the audio data from the web server 14 in step S200. If the CPU 44 determines to acquire the audio data in step S200, the information terminal 12 transmits the language setting indicating English to the web server 14 in step S201, acquires the audio data in English in step S202, and saves the acquired audio data in English into the information terminal 12 in step S203. In a case where the audio data previously saved is present, the information terminal 12 deletes the present audio data in step S203, and saves the new audio data acquired in step S202.

Even if the language setting is changed by the processing illustrated in FIG. 6, the audio data after the change is acquired from the web server 14 and the acquired audio data is saved into the information terminal 12. Therefore, when the audio data is used after the acquisition of the audio data, the audio data can be output, even if the information terminal 12 is not connected to the Internet.

The target data to be saved is not limited to the agreement items and the audio data described above, and may be image data or text data including a character string corresponding to a language.

The "language setting" in the above-described exemplary embodiment may be language setting made in an operating system (OS) of the information terminal 12 and applied to a plurality of application programs, or may be language setting made for each application program. Alternatively, the "language setting" is not limited to the information indicating a language, and may be information that can identify a language in setting such as "region setting".

In a case where the previously saved data is present when the data is saved into the information terminal 12 in step S105 illustrated in FIG. 5 or in step S203 illustrated in FIG. 6, the previously saved data is deleted. However, this is not limitative, and the new data may be added while the previously saved data is maintained. In this case, for example, in step S200 illustrated in FIG. 6, if the previously saved data corresponding to the setting after the change is present, the CPU 44 may determine not to acquire the data from the web server 14. Therefore, in a case where the user uses the information terminal 12 by frequently switching between, for example, English and Japanese, both the audio data in English and Japanese are saved into the information terminal 12. Accordingly, it becomes unnecessary to acquire the audio data from the web server 14, each time the language setting is switched.

The information terminal 12 acquires the data corresponding to the setting of the information terminal 12, when accessing the web server 14. However, this is not limitative. For example, the application 11 may hold a change history of the setting, and the information terminal 12 may acquire all the data corresponding to all the settings included in the change history and save the acquired data, when accessing the web server 14. Specifically, for example, in a case where the setting is the language setting, and the language setting of the application 11 has been made for Japanese, English, and Italian, three settings of Japanese, English, and Italian are saved in the change history of the setting. Further, in a case where the data to be acquired from the web server 14 is display data indicating the agreement items, the information terminal 12 acquires the display data indicating the agreement items corresponding to the setting of each of Japanese, English, and Italian, and save the acquired display data, when accessing the web server 14. Therefore, not only the data corresponding to the latest language setting when the information terminal 12 accesses the web server 14, but also the data corresponding to the language setting that has been made before, are saved into the information terminal 12.

Other Embodiments Embodiment(s) of the present disclosure can also be realized by a computerized configuration(s) of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computerized configuration(s) of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computerized configuration(s) may comprise one or more processors, one or more memories, circuitry, or a combination thereof (e.g., central processing unit (CPU), micro processing unit (MPU), or the like), and may include a network of separate computers or separate processors to read out and execute the computer executable instructions. The computer executable instructions may be provided to the computerized configuration(s), for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2018-115546, filed Jun. 18, 2018, which is hereby incorporated by reference herein in its entirety.

What is claimed is:

1. An information processing apparatus comprising:
a storage which stores data corresponding to a language; and
at least one processor,
wherein the at least one processor performs:
transmitting, in a case where first data corresponding to a first language is saved in storage, language information of a second language different from the first language, to a server;
acquiring second data corresponding to the second language from the server, based on the transmission of the language information;
determining whether to output the acquired second data;
outputting the acquired second data based on the acquired second data being determined to be output in the determining;
saving the second data into the storage based on a result of the determination; and
outputting the second data saved in the storage based on an instruction provided by a user,
wherein the at least one processor saves the second data into the storage in a case where it is determined to output the second data and an instruction is provided by the user after output of the second data, and
the at least one processor saves the second data into the storage in a case where it is determined not to output the second data.

2. The information processing apparatus according to claim 1, wherein the at least one processor transmits the language information based on an instruction for selecting a predetermined service to be provided via the server, and
the first data is a first agreement item which is described by the first language and is about the predetermined service, and the second data is a second agreement item which is described by the second language and is about the predetermined service.

3. The information processing apparatus according to claim 2, wherein the at least one processor causes a display device to display the second agreement item, in the outputting of the acquired second data and the outputting of the second data stored in the storage.

4. The information processing apparatus according to claim 3, wherein the at least one processor saves the second agreement item into the storage, on condition that the user agrees to the displayed second agreement item.

5. The information processing apparatus according to claim 1, wherein the data is audio data, and the at least one processor causes an audio device to perform audio output of the audio data.

6. The information processing apparatus according to claim 1, wherein the at least one processor determines whether to output the acquired second data based on the first data and the second data.

7. The information processing apparatus according to claim 1, wherein the at least one processor determines whether to output the acquired second data based on timing corresponding to the second data being later than timing corresponding to the first data.

8. The information processing apparatus according to claim 1, wherein the at least one processor saves the second data into the storage in a case where the first language and the second language are different and it is determined not to output the acquired second data.

9. The information processing apparatus according to claim 1, wherein the at least one processor executes the transmitting, the acquiring, the saving, and the outputting, by executing an application program to cause a printer to print an image.

10. An information processing method for outputting data acquired from a server, the information processing method comprising:
transmitting, in a case where first data corresponding to a first language is saved in a storage, language information of a second language different from the first language, to a server;
acquiring second data corresponding to the second language from the server, based on the transmission of the language information;
determining whether to output the acquired second data;
outputting the acquired second data based on the acquired second data being determined to be output in the determining,
saving the second data into the storage based on a result of the determination; and outputting the second data saved in the storage based on an instruction provided by a user, wherein the second data is saved into the storage in a case where it is determined to output the second data and an instruction is provided by the user after output of the second data, and the second data is saved into the storage in a case where it is determined not to output the second data.

11. The information processing method according to claim 10, wherein the transmitting transmits the language information based on an instruction by the user for selecting a predetermined service to be provided via the server, and the first data is a first agreement item which is described by the first language and is about the predetermined service, and the second data is a second agreement item which is described by the second language and is about the predetermined service.

12. The information processing method according to claim 11, wherein a display device displays the second agreement item, in the outputting of the acquired second data and the outputting of the second data stored in the storage.

13. The information processing method according to claim 12, wherein the second agreement is saved into the storage in the saving, on condition that the user agrees to the displayed second agreement item.

14. The information processing method according to claim 10, wherein the data is audio data, and an audio device performs audio output of the audio data.

15. The information processing method according to claim 10, wherein the determining determines whether to output the acquired second data based on the first data and the second data.

16. The information processing method according to claim 10, wherein the determining determines whether to output the acquired second data based on timing corresponding to the second data being later than timing corresponding to the first data.

17. The information processing method according to claim 10, wherein the second data is saved into the storage in a case where the first language and the second language are different and it is determined not to output the acquired second data.

18. The information processing method according to claim 10, wherein the transmitting, the acquiring, the saving, and the outputting are executed, by an application program to cause a printer to print an image.

19. A non-transitory storage medium that stores a program for causing a computer to execute an information processing method for outputting data acquired from a server, the information processing method comprising:

transmitting, in a case where first data corresponding to a first language is saved in a storage, language information of a second language different from the first language, to a server;

acquiring second data corresponding to the second language from the server, based on the transmission of the language information;

determining whether to output the acquired second data;

outputting the acquired second data based on the acquired second data being determined to be output in the determining, saving the second data into the storage based on a result of the determination; and outputting the second data saved in the storage based on an instruction provided by a user, wherein the second data is saved into the storage in a case where it is determined to output the second data and an instruction is provided by the user after output of the second data, and the second data is saved into the storage in a case where it is determined not to output the second data.

* * * * *